(12) United States Patent
Arling et al.

(10) Patent No.: US 8,254,576 B2
(45) Date of Patent: Aug. 28, 2012

(54) SYSTEM AND METHOD FOR LIMITING ACCESS TO DATA

(75) Inventors: Paul D. Arling, Irvine, CA (US); Patrick H. Hayes, Mission Viejo, CA (US); Wayne Scott, Newport Beach, CA (US); Christopher Alan Chambers, Stanton, CA (US)

(73) Assignee: Universal Electronics, Inc., Cypress, CA (US)

( * ) Notice: Subject to any disclaimer, the term of this patent is extended or adjusted under 35 U.S.C. 154(b) by 2345 days.

(21) Appl. No.: 11/103,301

(22) Filed: Apr. 11, 2005

(65) Prior Publication Data

US 2005/0195979 A1    Sep. 8, 2005

Related U.S. Application Data

(63) Continuation of application No. 10/317,891, filed on Dec. 12, 2002, now Pat. No. 6,882,729.

(51) Int. Cl.
*H04K 1/00* (2006.01)

(52) U.S. Cl. ........ 380/270; 380/255; 380/256; 380/257; 380/258; 380/259; 380/260; 380/261; 380/262; 380/263; 380/264; 380/265; 380/266; 380/267; 380/268; 380/269; 455/403; 455/402; 455/404.1; 455/404.2; 455/405; 455/406; 455/407; 455/408; 375/240; 375/240.01; 375/240.02

(58) Field of Classification Search .......... 380/255–270; 455/403–408; 375/240, 240.01, 240.02
See application file for complete search history.

(56) References Cited

U.S. PATENT DOCUMENTS

| 5,471,254 | A | 11/1995 | Claassen |
| 5,473,318 | A | 12/1995 | Martel |
| 5,517,569 | A | 5/1996 | Clark |
| 5,675,647 | A | 10/1997 | Garneau et al. |
| 5,686,904 | A | 11/1997 | Bruwer |
| 5,721,583 | A | 2/1998 | Harada et al. |
| 5,774,065 | A | 6/1998 | Mabuchi et al. |
| 5,898,397 | A | 4/1999 | Murray |
| 5,949,492 | A | 9/1999 | Mankovitz |

(Continued)

FOREIGN PATENT DOCUMENTS

DE    29617704 U1    1/1997

(Continued)

OTHER PUBLICATIONS

Microchip Technology HCS515 Code Hopping Encoder Datasheet, Jun. 2001.

(Continued)

*Primary Examiner* — Matthew Heneghan
*Assistant Examiner* — Roderick Tolentino
(74) *Attorney, Agent, or Firm* — Greenberg Traurig, LLP (57) ABSTRACT

A controlling device provides conditional access to secured content renderable by an appliance. The controlling device transmits a data frame to the appliance and encrypts at least a part of the data frame that includes data to be used by the appliance to provide access to the secured content. At the appliance a decryption key complimentary to the encryption key is used to decrypt the received the data frame. The appliance allows the secured content to be rendered only after the appliance determines that the data in the received, decrypted data frame includes the data the appliance requires to provide access to the secured content.

24 Claims, 9 Drawing Sheets

U.S. PATENT DOCUMENTS

| | | | |
|---|---|---|---|
| 5,957,695 A | 9/1999 | Redford et al. | |
| 5,982,892 A | 11/1999 | Hicks et al. | |
| 5,999,629 A | 12/1999 | Heer et al. | |
| 6,026,165 A | 2/2000 | Marino et al. | |
| 6,157,719 A * | 12/2000 | Wasilewski et al. | 380/210 |
| 6,166,650 A | 12/2000 | Bruwer | |
| 6,175,312 B1 | 1/2001 | Bruwer et al. | |
| 6,181,252 B1 | 1/2001 | Nakano | |
| 6,191,707 B1 | 2/2001 | Taniguchi et al. | |
| 6,223,348 B1 | 4/2001 | Hayes et al. | |
| 6,226,383 B1 | 5/2001 | Jablon | |
| 6,275,991 B1 | 8/2001 | Erlin | |
| 6,424,927 B1 * | 7/2002 | Sechi et al. | 702/126 |
| 6,424,947 B1 | 7/2002 | Tsuria et al. | |
| 6,657,535 B1 | 12/2003 | Magbie et al. | |
| 6,748,080 B2 * | 6/2004 | Russ et al. | 380/239 |
| 6,804,357 B1 * | 10/2004 | Ikonen et al. | 380/241 |
| 6,882,729 B2 * | 4/2005 | Arling et al. | 380/274 |
| 7,200,868 B2 * | 4/2007 | Mattox et al. | 726/26 |
| 2001/0039665 A1 | 11/2001 | Wilkins | |
| 2002/0064282 A1 | 5/2002 | Loukianov et al. | |
| 2002/0180581 A1 | 12/2002 | Kamiwada et al. | |
| 2003/0025589 A1 | 2/2003 | Koike | |
| 2003/0028883 A1 | 2/2003 | Billmaier et al. | |

FOREIGN PATENT DOCUMENTS

| | | |
|---|---|---|
| EP | 0417735 A2 | 3/1991 |
| EP | 0808972 A2 | 11/1997 |
| WO | WO 94/09570 | 4/1994 |
| WO | WO 98/57510 | 12/1998 |

OTHER PUBLICATIONS

IBM Technical Disclosure NNRD421138, "Theft-deterent Device for Electronic Equipment", 1999.

Menezes, Oorschot, Vanstone: "Handbook of 1-78 Applied Cryptography", CRC Press Series on Discrete Mathematics and its Applications, 1997, pp. 578-581, 546-548, 568, 500-501, 387, 397-401.

* cited by examiner

Normal operation (Mode 0)

Initialization (Mode 1)

SYSTEM AND METHOD FOR LIMITING ACCESS TO DATA

RELATED APPLICATION

This application is a continuation of U.S. application Ser. No. 10/317,891 filed on Dec. 12, 2002, which application is hereby incorporated by reference in its entirety.

BACKGROUND OF THE INVENTION

This invention relates generally to data systems and, more particularly, to a system and method for limiting access to data.

Data systems, such as satellite television broadcasting systems, cable television broadcasting systems, terrestrial digital broadcasting systems, Webcasting systems, etc., are well known. In connection with the operation of such systems, it is recognized that data is often pirated, e.g., program content is accessed and viewed without a valid subscription. In an attempt to prevent unauthorized access to data, providers of the data, such as DirectTV, Echostar, BskyB, etc., typically incorporate security measures into one or more of their system components. For example, a system component may utilize a "smart card" or similar, secure, non-volatile memory for storing access authorization and level of service information that is needed to access the data. However, since smart cards are susceptible to being "hacked" or "cloned," such security measures are often circumvented and unauthorized and unpaid access to the data remains a problem.

SUMMARY OF THE INVENTION

To overcome this and other problems, a system and method for limiting access to data is provided. To this end, a data system includes a secured appliance that is adapted to provide access to data and a remote control adapted to communicate with the secured appliance. The remote control and the secured appliance are further adapted to have a limited capacity to cooperate until such time as the secured appliance is provided with a decryption key that is complimentary to an encryption key provided to the remote control. The encryption key is used to encrypt at least a part of a data frame transmitted by the remote control to the secured appliance. In this manner, the use of a remote control to command the operation of the secured appliance to gain access to the data may be limited.

A better understanding of objects, advantages, features, properties and relationships of the invention will be obtained from the following detailed description and accompanying drawings which set forth illustrative embodiments that are indicative of the various ways in which the principles of the invention may be employed.

BRIEF DESCRIPTION OF THE DRAWINGS

For a better understanding of the invention, reference may be had to preferred embodiments shown in the following drawings in which.

DETAILED DESCRIPTION

Figure 1:
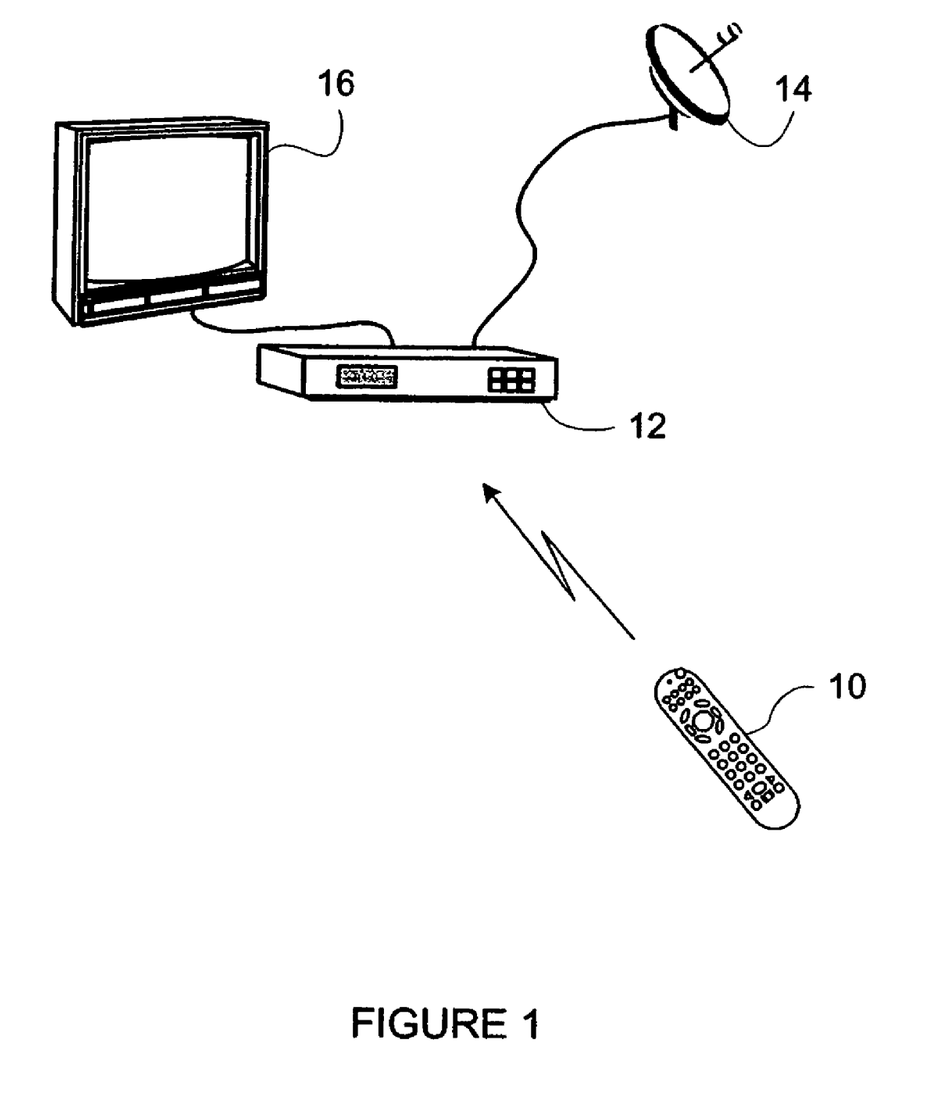
FIG. 1 illustrates an exemplary system in which the principles of the invention may be employed.

Turning now to the figures, wherein like reference numerals refer to like elements, there is illustrated in FIG. 1 an exemplary remote control 10 and secured appliance 12, in the exemplary form of a set top box device, which are component elements of a data system. As will be described hereinafter, the remote control 10 and secured appliance 12 cooperate to provide a measure of system security, i.e., to limit access to system data. To this end, the remote control 10 is preferably adapted to be non-functional or partially functional with respect to the secure appliance 12, i.e., it has a limited capability to cooperate with the secured appliance, until steps are completed to register the remote control 10 with the secured appliance 12. Generally, the registration process involves a consumer contacting a data provider and initiating a subscription. In this manner, consumers that acquire "grey market" secured appliances 12 and/or cloned access cards for use in connection with secured appliances 12 will be unable to enjoy the convenience of remotely operating the secured appliance 12.

During a typical registration process, a consumer contacts a data provider (for example, via phone) to initiate service once any home components of the system (e.g., a satellite receiver dish 14 and set top box device 12) are installed and readied for operation. At this time, the data provider generally associates billing details, a phone number, a service level, etc. with a number associated with the home component(s), for example, encoded on an access card 230 installable in the set top box device 12. The data provider may also cause decryption/authorization codes to be downloaded to the home component(s). In keeping with the proposed security system, a further procedure, which is described hereinafter, may be used during the course of system setup that functions to unlock the remote control 10 that is supplied with one or more of the installed home component(s). In this manner, a consumer that purchases components and, for example, installs an unauthorized access card will not be able to use the functionality of the remote control 10 since they have not contacted the data provider to legitimately activate the data service.

To provide an additional level of security, it is preferred that the process described hereinafter is used to unlock a specific remote control 10 so as to provide a one-to-one relationship with one or more specific system components. If this one-to-one relationship were not present, i.e., if the process simply enabled the system components to receive remote control signals, then this ability, being itself included as part of the data stored onto the access card, would be transferable via a cloned, access card. It is further preferred that the data element that is utilized to characterize the one-to-one relationship be non-static. For example, if the remote control 10 simply transmitted a fixed serial number to match a number encoded onto the access card, then a cloned access card could still be used in conjunction with a "learner" remote control which had been taught the original serialized OEM remote control code that is matched to the serial number stored onto the access card. To provide non-fixed number matching, the security system, as described hereinafter, may utilize the encryption/rolling code implementations described in, for example, U.S. Pat. Nos. 5,686,904, 6,175,312, 6,191,707, and 6,166,650. Additional information may also be gleaned from An Introduction to KeeLoq® Code Hopping (document DS91002) or HCS500 KeeLoq® Code Hopping Decoder (document DS4053) both of which are published by the assignee of the aforementioned patents, Microchip Technology, Inc.

For use during the setup of system components, it may be preferred to allow some basic remote control functionality to be available prior to the initialization of service with the data provider. This is especially desirable in the case where, for example, the remote control 10 is needed to interact with system setup menus, enter satellite dish alignment parameters, etc. as part of the installation process. These types of setup procedures would typically be performed prior to the establishment of service in a broadcast data transmission system. Turning to FIG. 1, there is illustrated exemplary system components in the form of a satellite receiver 14 and set top box device 12 for providing data transmission to a television 16. It is to be understood that these system components are presented by way of example only and are not intended to be limiting. Secured, set top box devices may include an HDTV decoder set top box, a terrestrial digital broadcast decoder set top box, a set top box adapted to receive and decode Webcasts, etc. Additional or alternative system components could take the form of a personal computer, etc. without limitation.

For remotely controlling the operation of the illustrated system components, a remote control 10 is provided. Thus, in response to activation of remote control keys (hard or soft keys, voice activated command "keys," etc.), the remote control 10 transmits commands to, for example, the set top box device 12, using IR, RF, or other suitable transmission medium, to control the operation of the intended target, system component. Since technologies for encoding and decoding wireless remote control signals are well known in the art, demonstrated, for example, by commonly assigned U.S. Pat. No. 5,887,702 and co-pending U.S. Patent Application Ser. No. 60/386,301, these technologies will not be described herein for the sake of brevity.

Figure 2:
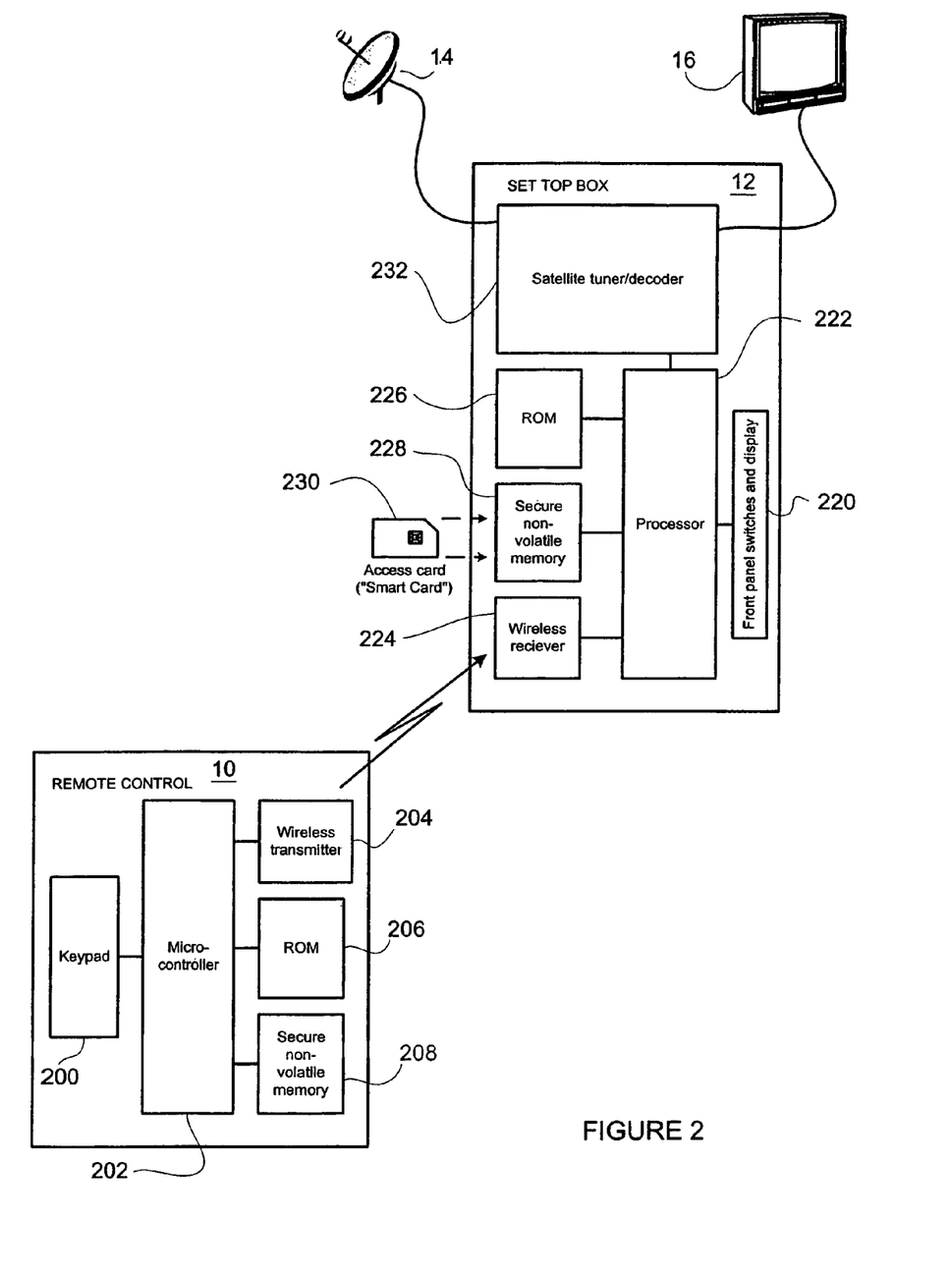
FIG. 2 illustrates a block diagram of an exemplary remote control and an exemplary set top box device incorporated as part of the system illustrated in FIG. 1.

Illustrated in FIG. 2 is an exemplary, internal architecture of a remote control 10 and set top box device 12. In this regard, the remote control 10 preferably includes a keypad 200 or the like for accepting user input, a ROM 206 containing programming instructions and data to enable a microcontroller 202 to detect key activations and to encode the key activations into packets of data to be sent to, for example, the set top box device 12 via the wireless transmitter 204. The remote control 10 may also include a non-volatile, writeable memory 208 for storage of operating parameters, serial number(s), encryption key(s), etc. as necessary for operation of the remote control programming. It will be appreciated that a non-latile, writeable memory 208 may take the form of an EEPROM, Flash memory, battery-backed-up static RAM, etc. and may be physically separate from or integrated into the microcontroller 202 unit as appropriate. Preferably, the non-volatile, writeable memory 208 is equipped with measures, which are well known in the art, to prevent any unauthorized reading out of its contents.

Similarly, the illustrated set top box device 12 includes a user interface 220, a microcontroller 222 and a ROM memory 226. In the set top box device 12, the microcontroller 222 functions to direct the reception and decoding of satellite broadcast data by the tuner/decoder 232 in accordance with user commands received from the user interface 220 or from the remote control 10 via the wireless receiver 224 utilizing programming authorizations and configuration information stored in non-volatile memory 228. The non-volatile memory 228 may be implemented using one of several known technologies and all or part of the non-volatile memory 228 may take the form of a detachable access card 230.

Figure 3:
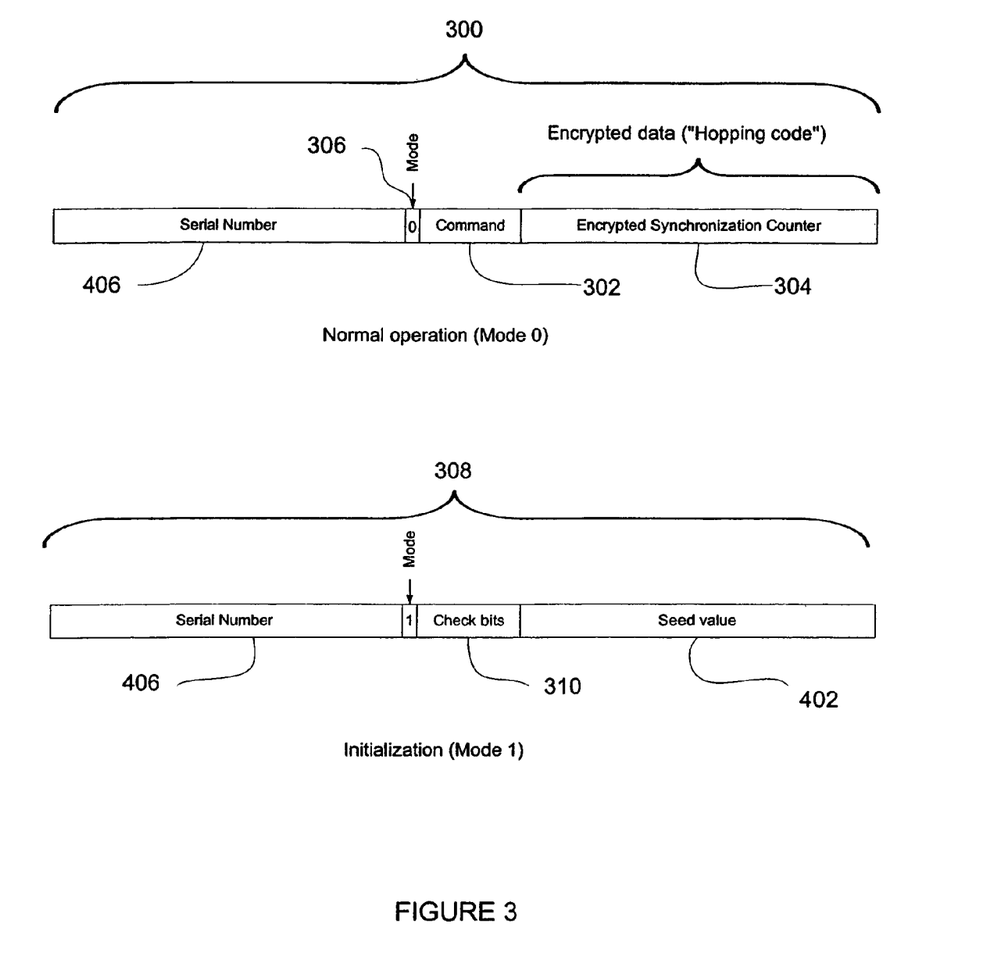
FIG. 3 illustrates exemplary data frames between the remote control and set top box device of FIG. 1.

To communicate with the set top box device 12, for example, the remote control 10 transmits data frames comprising several data fields as illustrated in FIG. 3. During normal operation, the transmitted data frame 300 preferably includes a data field containing data indicative of a serial number 406, a data field containing data indicative of a command 302, a data field containing data indicative of an encrypted synchronization counter 304, and a data field containing data indicative of a mode 306. In this example, the data frame 300 may be used to indicate that transmitted data is to be used as part of a special set-up mode of operation (delineated by the data in the mode indicator field 306) in which data values assume a different significance, as discussed hereinafter. It is to be understood that the sizes, ordering, etc. of the data fields in the illustrated and described data frame 300 are exemplary only and, as such, are not intended to be limiting. It is to be further understood that, when communicating with conventional or non-secured appliances, i.e., those not subject to the security measures discussed herein, not all of these data fields are required. Rather, in those cases where commands are to be transmitted to non-secured appliances (e.g., the television 16), conventional remote control communication data frames, for example, may be employed.

Within the exemplary data frame 300, serial number data 406 and command data 302 may be transmitted in the clear, i.e., they need not be encrypted. It is preferred, however, that the synchronization counter data 304 be encrypted using a "rolling-code." The serial number data 406 may be defined using twenty-four (24) bits that function to identify the individual remote control unit 10. Preferably, the serial number data 406 is assigned at a time of manufacture and stored, in a protected form, in the non-volatile memory 208. While there is no requirement that the serial number data 406 be absolutely unique, it is preferred that sufficient bits are provided to allow a serial number to be defined that is unlikely to correspond to a serial number provided to a co-located remote control unit.

The command field data 302 may be defined using seven (7) bits that function to define a remotely controllable operation of the target appliance. The data for populating the command field is normally selected based upon user input, for example, via activation of a remote control key. The remote control 10 can be pre-configured so as to utilize command codes recognizable by an appliance, e.g. a purchased appliance with which the remote control is packaged, or may be user-configurable, using one or more well-known remote control setup methodologies. Within the command field, one or more of the command field data bits can be assigned for error detection purposes, i.e., to function as a parity bit, when mutually supported by the target appliance. As will be seen, however, this is not required since the serial number data 406 and the encrypted synchronization counter data 304, which may be defined using forty-eight (48) bits, will be expected to have exact values before a command is acted upon by the receiving appliance (in the case where the receiving appliance is subject to the security measures discussed herein).

For use in providing system security, the synchronization counter data 304, which may be defined using sixteen (16) bits, is preferably incremented by a predetermined amount, e.g., by one, each time the remote control 10 experiences a new input, e.g., a key press, that is to result in the transmission of a data frame, in particular, to a target, secured appliance, e.g., the set top box device 12. If multiple, secured appliances are to be commanded, it is desired to maintain a separate synchronization count for each. It is preferred that the number of bits used to describe the synchronization counter data be sufficient such that a high number of transmission generating inputs are required before the value wraps back to a previously used value. In the example described, a 16-bit data field would allow approximately 65,000 values to be used. Before transmission occurs, it is also preferred that the synchronization counter data 304 be encrypted using a secret encryption key that is securely stored in the non-volatile memory 208 of the remote control 10. It is to be appreciated that the exact encryption algorithm used is not significant provided that the size of the encryption key and the accompanying key generating algorithm cause the change in value of many bits in the encrypted, "hopping," transmitted value of the synchronization counter data 204 in response to the change of even one bit in the synchronization counter data. In the example used, the resulting encrypted synchronization counter value is 24 bits long.

Upon receipt of a data frame 300, during normal operation, the secured appliance 12, e.g., the set top box device, may first verify the remote control serial number data 406 against a value stored into the non-volatile memory 228/230 of the secured appliance 12 during the process of initializing the system with the broadcast data provider, which process is described hereinafter. If the serial number data 406 matches the value stored with the secured appliance 12, the secured appliance 12 may next decrypt the "hopping" data contained in the encrypted synchronization counter data field 304. This decryption uses a decryption key that is also stored into the non-volatile memory 228/230 of the secured appliance 12 during the process of initializing the system with the broadcast data provider. If the value of the decrypted data does not match an expected value (i.e., the secured appliance 12 maintains a synchronization count that should correspond to that within the remote control 10) and, in particular, if it corresponds to a value previously utilized, the secured appliance 12 may be programmed to further ignore the received data frame 300 (i.e., the secured appliance 12 will not perform an operation as a result of receiving the data frame 300).

Figure 7:
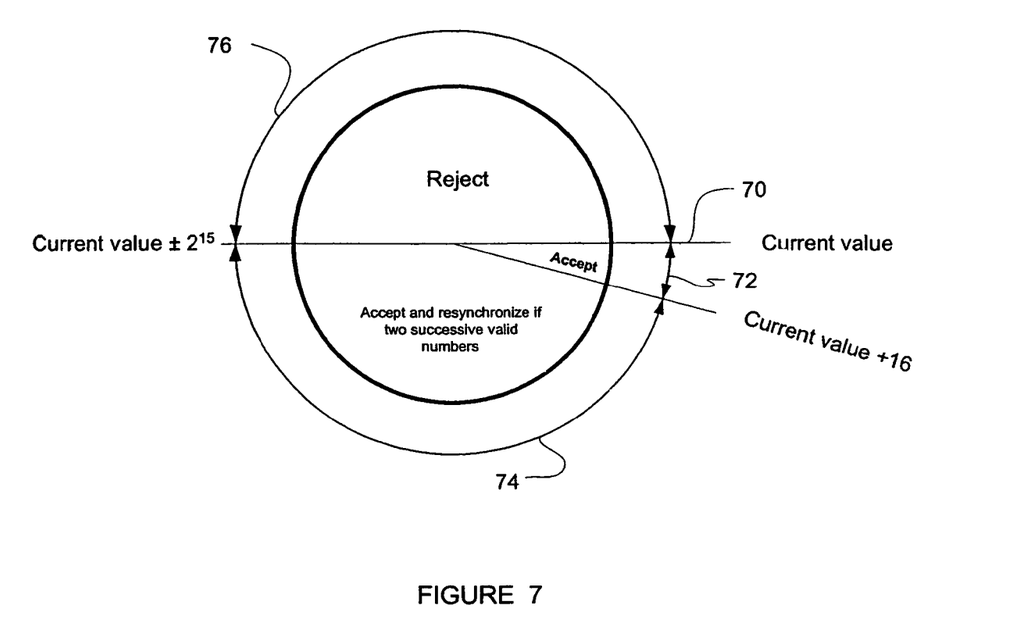
FIG. 7 illustrates operation of an exemplary synchronization counter utilized in connection with the transmission of data between the remote control and set top box device of FIG. 1.

As it is realized that the remote control 10 may be activated inadvertently when out of range or not pointed to the receiving, secured appliance 12, provision may be made to allow for re-synchronization of the synchronization counters of the remote control 10 and the secured appliance 12. While algorithms for re-synchronizing devices are well known and are described, for example, in the aforementioned patents assigned to Microchip Technology, Inc, a brief summary will follow for the convenience of the reader. With reference to FIG. 7, for use in re-synchronizing the devices, the possible values of the exemplary 16-bit synchronization counter may be divided into three segments or "windows" relative to the current value 70 of the synchronization counter in the receiving, secured appliance 12. By way of example, a first window 72 may be defined that represents the next sixteen values following the currently maintained synchronization counter value. Any message received from the remote control 10 with a synchronization-counter value within the range of this first window 72 can then be unconditionally accepted, the command contained within the command data field 302 acted upon, and the synchronization counter value within the receiving, secured appliance 12 can be updated to reflect the newly received value.

A second window 74 may also be defined so as to encompass the remaining balance of one-half of the possible values for the synchronization count, in the forward looking direction. If a message is received from the remote control 10 with a synchronization counter value that falls within this second window 74, the received synchronization counter value is temporarily stored in the secured appliance 12 but any command contained within the message is not acted upon. Then, if the next received message contains a synchronization counter value that has the next expected value when compared to the temporarily stored value, e.g., it is one higher than the value last received, the synchronization counter value within the receiving, secured appliance 12 can be updated to reflect the newly received value and the message acted upon. If the next received message contains a synchronization counter value that is not as expected, it should be ignored, although the procedure can be repeated, i.e., the received synchronization counter value is temporarily stored and used as a check against future received messages. It will be appreciated that if the next message received from the remote control has the same synchronization counter value that was received and temporarily stored, i.e., the remote control synchronization counter was not updated in response to a transmission generating event, the receiving, secured appliance 12 may then ignore the received transmission as having originated from what is likely to be a non-authorized device, e.g., a learner remote control.

If the synchronization counter data has a value that falls within the last window 76, representing in this example the remaining values immediately prior to the current synchronization counter value, it will be simply ignored. Thus, from the foregoing, it will be appreciated that, even if the remote control 10 is actuated for, by way of this example, more than 16 times while out of range of the target, secured appliance 12, all that is required to resynchronize the devices is to twice perform a transmission generating event while in range of the secured appliance 12. In addition, any unauthorized remote control that attempts to transmit "learned" or "parroted" data, i.e., it transmits the same synchronization value every time, will be ignored. Still further, the procedure allows for command to be acted upon only if all values within the data frame meet expectations. Thus, the secured appliance 12, e.g., the set top box device, is adapted to respond only to remote control commands which match values that are maintained by the secured appliance 12. Yet further, the secured appliance 12 will respond, as described below, only to data frames that are encrypted in a manner that is consistent with parameters established during system initialization. It will also be appreciated that an advantage of the data frame arrangement described above is that, since the command and serial number fields are transmitted "in the clear," the secured appliance may be adapted to respond to certain commands even before it is in possession of an appropriate decryption key. This feature may be advantageously used during the consumer set up procedure, as will become evident hereafter.

For use in encrypting data exchanged between the remote control 10 and the secured appliance 12, an encryption key may be used that is derived, for example, by feeding a fixed master value together with a randomly-generated seed value into a non-linear algorithm so as to produce a single large number, e.g., sixty-four bits in length. In this regard, the exact algorithm utilized is not significant. Rather, what is preferred is that the algorithm provide no readily-discernable relationship between the seed value and the resulting encryption key value.

Figure 4:
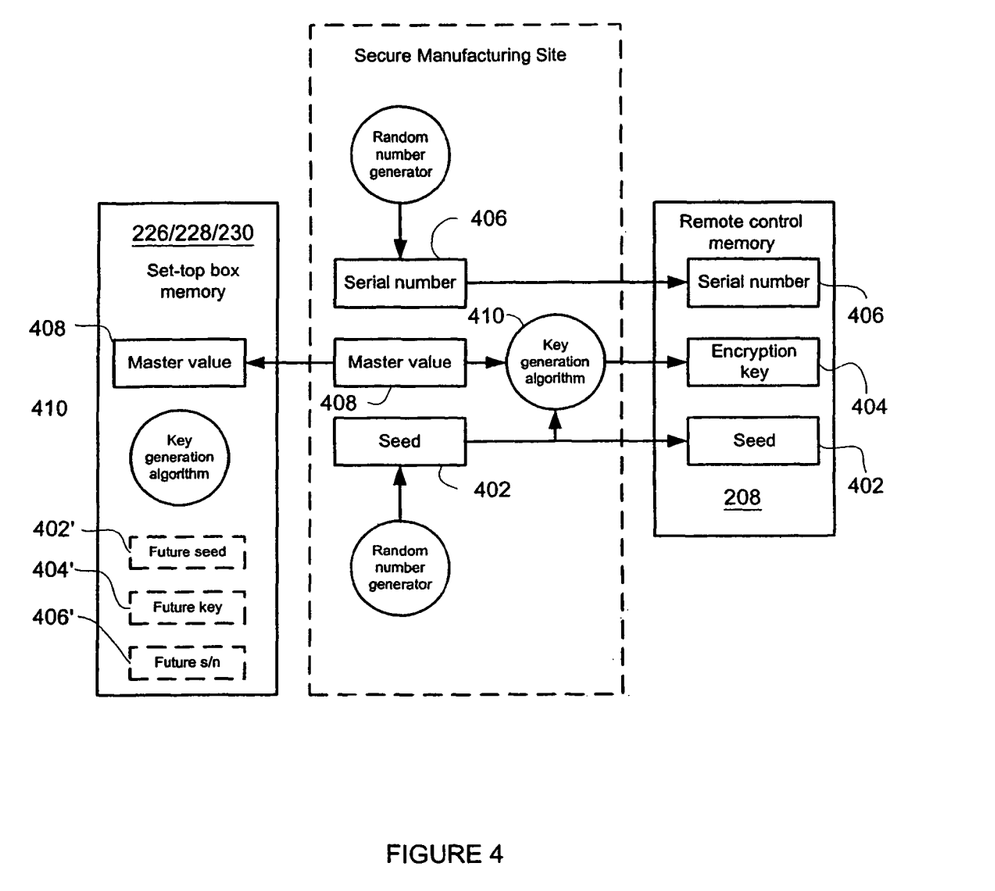
FIG. 4 illustrates an exemplary method for creating and storing encryption key values for use in connection with the transmission of data between the remote control and set top box device of FIG. 1.

By way of further example and with reference to FIG. 4, a random seed value 402 may be created for each remote control 10 that is stored in the non-volatile memory 208, together with the corresponding calculated encryption key 404 and a randomly generated serial number 406, at the time of manufacture of the remote control 10. The master value 408, which is used to calculate the encryption key 404, would not be stored in the remote control 10. The master value 408 and the key generation algorithm would, however, be stored in the secure memory of the secured appliance 12. Since these are fixed values, they may be stored in ROM 226 or alternatively in non-volatile memory 228. The memory 228 may also include space that is allocated for future storage of a seed value 402', encryption key 404', and serial number 406'.

To establish the one-to-one relationship between the remote control 10 and the secured appliance 12, during the initialization process the remote control 10 may transfer its stored seed value 402 to the secured appliance 12 where this value is used, together with the stored master value 408, to generate an encryption key 404' that matches the encryption key 404 stored with the remote control 10. Since the master value 408 and the algorithm 410 remain unknown, and there is no discernable relationship between the seed value 402 and the resulting encryption key 404, transfer of the seed value between the remote control 10 and the secured appliance 12 can occur in the clear. It will be appreciated that this will not compromise the secure nature of the hopping code encryption.

Figure 5:
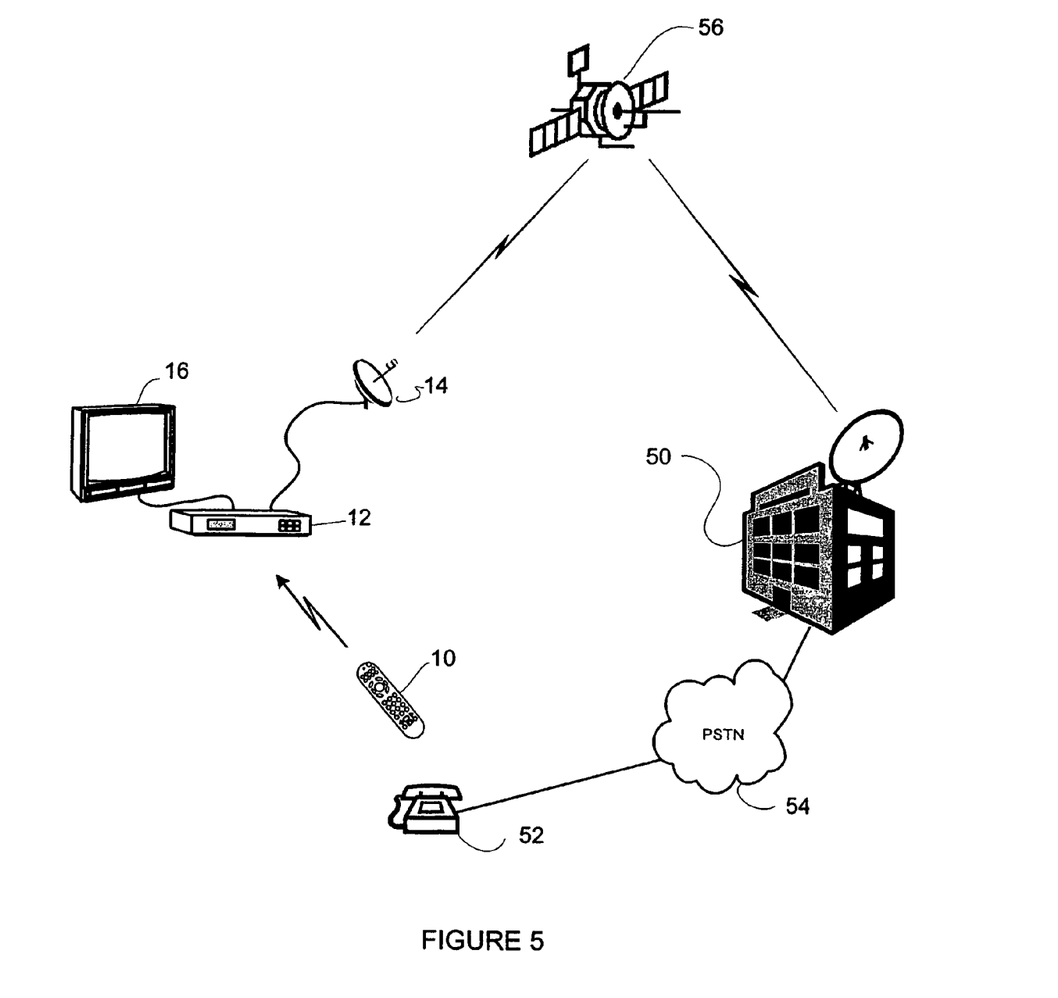
FIG. 5 illustrates an expanded view of an exemplary system including the components illustrated in FIG. 1.
Figure 6:
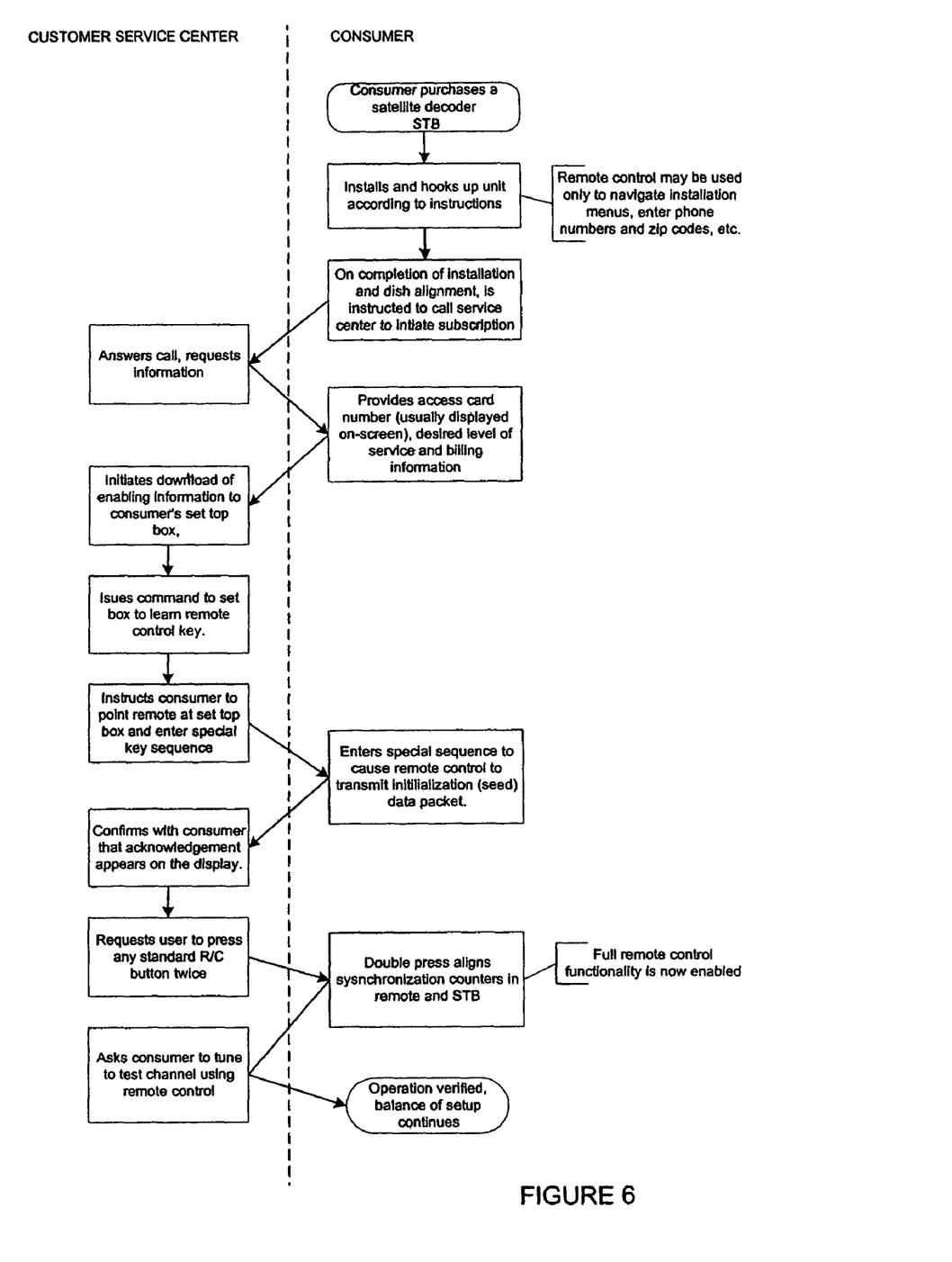
FIG. 6 illustrates a flow chart diagram of exemplary steps for initiating a subscription to data in the system illustrated in FIGS. 1 and 5.

An exemplary relationship between the various components of a secure data system is illustrated in FIG. 5. In this example, after the home system components, e.g., the set top box device 12 and satellite dish 14, have been installed and connected, the customer service center 50 of the data provider would be contacted, for example via telephone 52/54, for the purpose of setting-up an account and initiating service. In response, as illustrated in FIG. 6, the customer service center 50 would issue a communication with the set top box device 12, e.g., via the satellite link 56, for the purpose of storing the appropriate access enabling codes into the non-volatile memory 228/230 of the set top box device 12. At this time, the set top box device 12 may also be placed in a mode to receive the command decryption seed 402 from the remote control 10. If the remote control 10 is required to be used during the installation process, for example, to navigate system menus, enter configurations, etc., the set top box device 12 may be adapted to initially accept remote control commands, directed to this purpose, without checking serial number or synchronization counter data. Thus, the set top box device 12 may be limited to recognizing only specific commands required to perform the initial setup of the transmission system components, determined either by individual command functionality or based on context (e.g., numeric pad only recognized for parameter entry, not for changing channel, etc.).

As noted above, upon completion of the installation of the home system components, the service center 50 of the data provider would be contacted to initiate a subscription at which time a command may be transmitted to the set top box device 12, for example via the satellite link, to place the set top box device 12 in a mode to receive a special remote control information frame 308, illustrated by way of example in FIG. 3, which is indicated by the "1" in the mode data field. The consumer may then be prompted to enter a special key combination, e.g., to press and hold the "channel up" and "mute" keys for five seconds, to cause the remote control 10 to transmit the information frame 308, which contains the serial number and encryption seed values, to the set top box device 12. While not limiting, the illustrated embodiment includes a serial number comprised of twenty-four (24) bits and an encryption seed comprised of twenty-four (24) bits. As illustrated in FIG. 3, in the information frame 308, the exemplary seven (7) bit command data field is immaterial and, therefore, can be used for checking purposes, e.g., to hold a CRC value 310. Alternatively, the remote control 10 may be adapted to transmit the information frame 308 several times in succession to thereby allow the receiving secured device 12 to compare received data frames to verify accuracy of the received messages, in which case the additional seven bits may be used to increase the size of the transmitted seed value if desired. Once the receiving, secured device 12 is satisfied as to the integrity of the information frame data, the remote control serial number 406 is stored and the seed 402 is used to generate a matching decryption key 404' which is also stored.

It should be noted that if the secured device 12 has not been placed into a mode to receive the special remote control information frame 308, for example, via the aforementioned command from the provider's service center, the secured device 12 will be expecting to receive standard frames 300 and will, therefore, reject any information frame 308 as failing to meet the synchronization criteria described earlier. In this manner, a user may be prevented from initializing a secure device/remote control relationship except under the guidance of the data provider's service center. For this reason, the secured device 12 may also be equipped with a time-out to allow the secured device 12 to revert to a mode of normal operation in the event a valid information frame 308 is not received within a reasonable time after the secured device 12 is placed into the mode for receiving the information frame 308. Alternatively, the secured device 12 may be restored to normal operation via a second command issued from the provider's service center.

In keeping with these principles, it is further contemplated that the seed value 402, which was used at time of manufacture to generate the encryption key embedded in the remote control 10, may be affixed to the remote control by way of a label, imprint, etc., whereby the consumer can relay that value verbally, via email, or the like to the service center. The service center would, in turn, then transmit the seed value to the secured appliance 12, for example, via the satellite link 56, Internet link, etc. When included on a label or other readable medium, the seed value may also be encoded using bar code symbols or the like that may be directly readable by the secured appliance 12 or by an appliance that, in turn, communicates the information to the service center. The seed value could also be encoded using sound signals that would be interpretable by the secured appliance 12, either directly or indirectly via the service center. Still further, the consumer may at an appropriate time (e.g., when the secured device 12 has been placed in a mode to receive the encryption seed value) be instructed to manually enter this seed value number into the secured appliance 12 using the numeric pad provided on the remote control or a numeric pad or the like associated with the secured appliance 12.

To provide a confirmation of a successful setup, a confirmation message may be displayed to the consumer, for example, via a message displayed on the appliance itself, the television 16, or the like, and the consumer may then be prompted to perform a verification test, e.g., to press any two remote control keys in sequence. This procedure is particularly useful to verify within the set top box that the decryption key has been correctly calculated (if not, the decrypted hopping value would not yield expected synchronization counter values) and also serves to align the synchronization counters of the remote control 10 and the set top box device 12, as described previously. Once the initialization is complete, full remote control functionality is available to the consumer.

Figure 8:
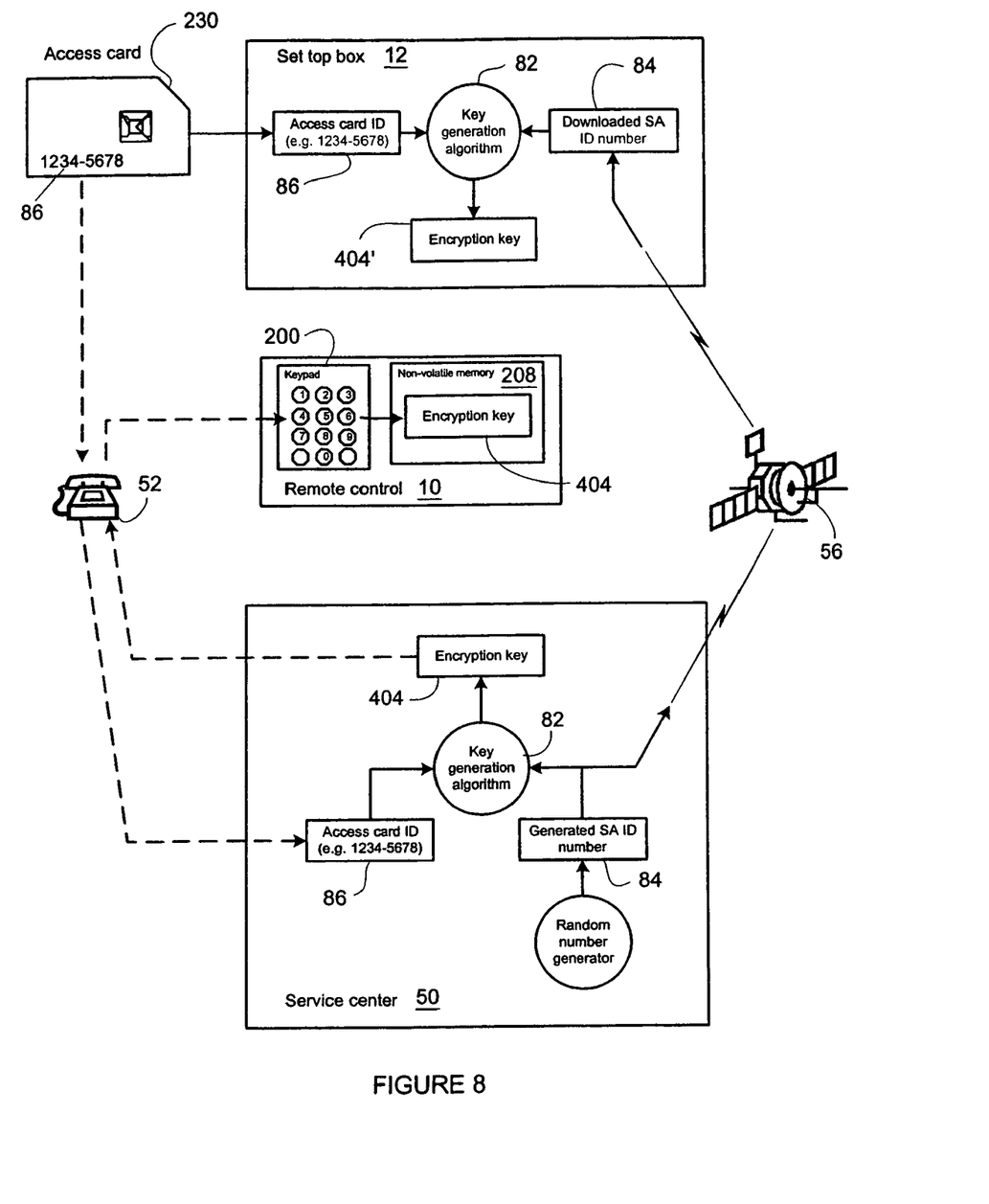
FIG. 8 illustrates a further, exemplary method for creating and storing encryption key values for use in connection with the transmission of data between the remote control and set top box device of FIG. 1.

An encryption key for use in implementing secure data transmissions between the remote control 10 and a secured appliance 12 may also be created in the manner illustrated in FIG. 8. In this illustrated.example, where dotted lines represent human data transfer—e-mail, verbalizations, etc.—and solid lines represent electronic data transfer, the access card ID value, which is known, is used in conjunction with a randomly generated secret number, that may be downloaded into the secured appliance 12, to create the encryption key. More specifically, upon installation of the system components, the consumer would contact the service center of the data provider, for example via phone 52, to provide the ID number value 86 of the access card 230 to the operator. At the service center, the access card ID number value 86 may be combined with a randomly generated secured appliance ID number ("SA ID number") 84 to create the encryption key value 404. Simultaneously, the SA ID number 84 is transmitted to the secured appliance 12, for example, via the satellite link 56. In the secured appliance 12, the same key generation algorithm 82 as used at the service center is applied to the received SA ID number 84 and the access card ID number value 86 (with the access' card now being installed in the secured appliance 12) to re-create the encryption key value 404'.

The service center operator would also provide the encryption key value to the consumer. The consumer may then enter the encryption key value into the remote control 10, for example, using the keypad 200, once the remote control 10 has been placed into a state where it is ready to receive and store the encryption key value 404 in non-volatile memory 208. In this manner, the secured device 12 and the remote control 10 are provided with complimentary encryption/decryption keys. While in this example the encryption key itself is known, the SA ID number, which is required to install that encryption key value into the secure device, remains secret. Thus, the objective of preventing an unauthorized, secured device 12 from responding to remote control commands is still achieved.

Figure 9:
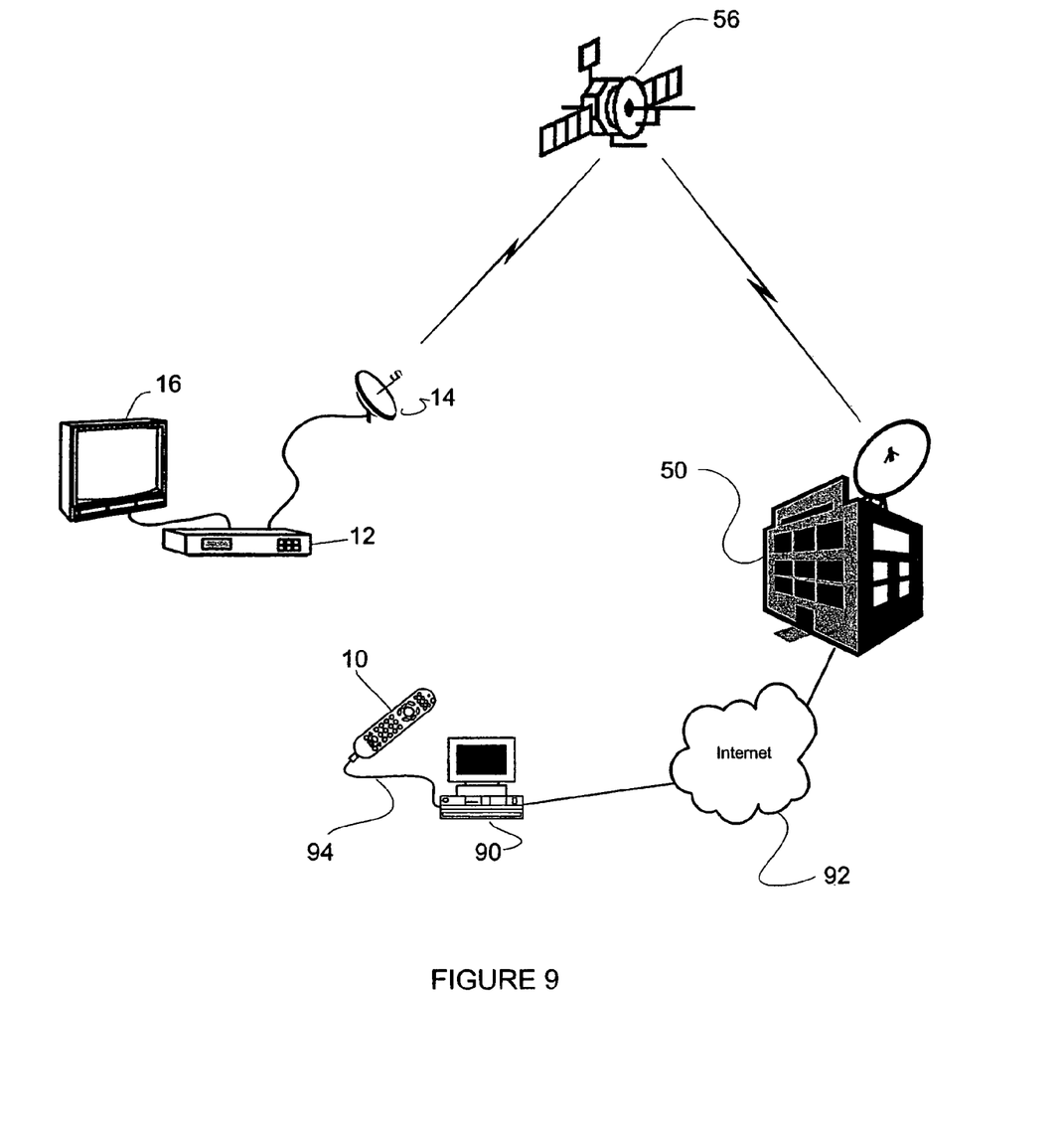
FIG. 9 illustrates an expanded view of a further, exemplary system including the components illustrated in FIG. 1

To effect the subscription and setup process, the Internet may also be utilized as illustrated in FIG. 9. In this case, the consumer would log-on to the service center 50 of the data provider, for example, using a personal computer 90 equipped with a Web browser. The Internet connection 92 may then be used to transfer data back and forth between the customer and the service center 50. For example, the encryption key value 404 may be communicated to the consumer either manually (e.g., via email as noted above) or electronically (e.g., downloaded into the remote control via a cable 94, docking station, magnetic modem, microphone—using speakers to provide sound coupling, etc. using techniques such as described in commonly assigned U.S. Pat. Nos. 4,959, 810, 5,953,144 and/or 5,537,483). It will be further understood that a direct communication link, e.g., a 800 dial-in number equipped with a modem, may be used in lieu of the Internet.

It will be further appreciated that, rather than using a seed and master value approach to generating the encryption key as described above, a public/private key algorithm could be implemented in which a private decryption key is embedded in the access card data, either at a time of manufacture or downloaded and stored as part of the service initialization process, and a complementary public encryption key is stored into the remote control 10 during the service initialization process. The key value may be determined by the service center based on the serial number of the access card installed in the secured device and/or decryption key value. Since the computations involved in such asymmetrical encryption algorithms may be intensive, it may also be possible to use this approach to effect the one-time transfer of a secret, fixed, symmetrical key value that is embedded into the remote control at the time of manufacture after which the hopping value would be encrypted as previously described. Still further, the remote control may be adapted to directly read configuration information from a smart card as described in commonly assigned U.S. Pat. No. 6,223,348. Preferably, in this case, the smart card is a one-time use smart card. In yet another variation, a simplified version of the system illustrated in FIG. 8 may use the generated and downloaded SA ID number as the encryption key. In this case, an additional level of security may be provided by loading the value into the remote control electronically, e.g., via the above-described magnetic modem, smart card, cable, docking station, etc., so as to avoid actual consumer knowledge of the exact numerical value.

Still further, it will be appreciated that the system may be adapted so as to allow a single remote control 10 to be utilized in connection with multiple secured appliances 12. In this case, a different encryption key may be utilized and maintained at the remote control for each individual secured appliance 12 such that only an intended target secured appliance will respond to a transmitted data frame. Still further, a data field can be included in the data frame that serves to identify the intended target secured appliance 12. The intended target secured appliance 12 may also be identified by the frequency and/or pulse pattern of the data frame. In these latter cases, the encryption keys need not be different. In addition, while these techniques may also be utilized to identify the intended target secured appliance of an information frame 308, the mode field of the data frame can also be expanded to allow the intended targets of an information frame to be uniquely identified.

While specific embodiments of the invention have been described in detail, it will be appreciated by those skilled in the art that various modifications and alternatives to those details could be developed in light of the overall teachings of the disclosure. For example, the system and methods described herein may be used to limit access to data stored on a digital media, such as a DVD, CD, Memory Card, etc. wherein the secured device is a DVD player, CD player, Computer, etc. In such cases, the DVD player, CD player, computer, etc. would include a means for allowing service initiating data to be downloaded into memory, for example, via an Internet connection, so as to cooperate with the remote control 10 in accordance with the various security techniques described above. Furthermore, the digital media may be provided with the equivalent of an access card ID for use in the initialization process. It will also be appreciated that the remote control 10 could take the form of a keyboard. Accordingly, the particular arrangements disclosed are meant to be illustrative only and not limiting as to the scope of the invention which is to be given the full breadth of the appended claims and any equivalents thereof. It is to be further understood that all references cited in this document are incorporated herein in their entirety.

What is claimed is:

1. A method for using a hand-held remote control device to provide conditional access to secured content renderable by an appliance, wherein the hand-held remote control device has a library of command data for commanding functional operations of a plurality of appliances including the rendering appliance, comprising:

transmitting from the hand-held remote control device to the appliance a data frame wherein the data frame comprises data used by the appliance to provide access to the secured content and wherein an encryption key is used by the hand-held remote control device to encrypt at least a part of the data frame that includes the data the appliance requires to provide access to the secure content prior to transmission of the data frame to the appliance;

receiving the data frame at the appliance;

using at the appliance a decryption key complimentary to the encryption key to decrypt the encrypted at least a part of the data frame received at the appliance from the hand-held remote control device; and allowing the secured content to be rendered by the appliance only after the appliance determines that the data in the received, decrypted data frame includes the data the appliance requires to provide access to the secured content;

and allowing the appliance to perform operations in response to received data frames from the hand-held remote control device in accordance with command data selected from the library included in the data frames excluding an operation which allows the secured content to be rendered by the appliance at least until such time as the appliance determines that data in a received, decrypted data frame is the data the appliance requires to provide access to the secured content.

2. The method as recited in claim 1, wherein a provider of the secured content provides the encryption key for use in the hand-held remote control device.

3. The method as recited in claim 1, wherein the appliance has a stored algorithm for generating the complimentary decryption key.

4. The method as recited in claim 3, wherein a provider of the secured content provides data for use in the algorithm for generating the complimentary decryption key.

5. The method as recited in claim 2, comprising receiving at the hand-held remote control unit via a network connection the encryption key.

6. The method as recited in claim 5, wherein the network comprises the Internet.

7. The method as recited in claim 5, wherein the network includes a phone line.

8. The method as recited in claim 1, comprising receiving into the hand-held remote control device data for use in generating the encryption key.

9. The method as recited in claim 1, wherein the encryption key and the decryption key comprises a private key and a public key pair.

10. The method as recited in claim 9, wherein the at least a part of the data frame that is encrypted includes a symmetrical key value.

11. The method as recited in claim 1, wherein the at least a part of the data frame that is encrypted includes a symmetrical key value.

12. The method as recited in claim 3, comprising receiving from the hand-held remote control device by the appliance data for use in the algorithm for generating the complimentary decryption key.

13. The method as recited in claim 1, wherein the data in the data frame the appliance requires to provide access to the secured content comprises at least a counter value.

14. The method as recited in claim 1, comprising transmitting the data frame to the appliance via a wireless transmission signal.

15. The method as recited in claim 14, wherein the wireless transmission signal comprises an infrared signal.

16. The method as recited in claim 14, wherein the wireless transmission signal comprises a radio frequency signal.

17. The method as recited in claim 1, wherein the appliance comprises a computer.

18. The method as recited in claim 1, wherein the appliance is a set top box linked to a digital broadcast network.

19. The method as recited in claim 13, comprising incrementing the counter value each time the hand-held remote control device experiences an input that results in a transmission of a data frame.

20. The method as recited in claim 1, wherein the encryption key is provided to the hand-held remote control device at a time of manufacture of the hand-held remote control unit.

21. The method as recited in claim 10, wherein the symmetrical key value is used at the appliance to decrypt subsequently received data transmissions transmitted from the controlling device.

22. The method as recited in claim 11, wherein the symmetrical key value is used at the appliance to decrypt subsequently received data transmissions transmitted from the controlling device.

23. A method for using a hand-held remote control device to provide conditional access to secured content renderable by an appliance, wherein the hand-held remote control device has a library of command data for commanding functional operations of a plurality of appliances including the rendering appliance, comprising:

transmitting from the hand-held remote control device to the appliance a data frame wherein the data frame comprises data used by the appliance to provide access to the secured content and wherein an encryption key is used by the hand-held remote control device to encrypt at least a part of the data frame that includes the data the appliance requires to provide access to the secured content prior to transmission of the data frame to the appliance;

receiving the data frame at the appliance;

using at the appliance a decryption key complimentary to the encryption key to decrypt the encrypted at least a part of the data frame received at the appliance from the hand-held remote control device; and allowing the secured content to be rendered by the appliance only after the appliance determines that the data in the received, decrypted data frame includes the data the appliance requires to provide access to the secured content;

and wherein the data frame further includes command data selected from the library and the selected command data included in the data frame is transmitted in unencrypted form.

24. The method as recited in claim 23, comprising allowing the appliance to perform operations corresponding to command data in received data frames excluding an operation corresponding to command data which would allow the secured content to be rendered by the appliance at least until such time as the appliance determines that data in a received, decrypted data frame is the data the appliance requires to provide access to the secured content.

* * * * *